(12) United States Patent
Lin

(10) Patent No.: US 6,370,877 B1
(45) Date of Patent: Apr. 16, 2002

(54) BRAKE HANDLE DEVICE FOR HYDRAULIC BRAKE ASSEMBLY

(76) Inventor: Chang Hui Lin, No. 13, Ju Wei Lane, Gin Lin Tsuen, Siu Shui Hsiang, Chang Hua Hsien (TW), 504

( * ) Notice: Subject to any disclaimer, the term of this patent is extended or adjusted under 35 U.S.C. 154(b) by 0 days.

(21) Appl. No.: 09/771,575

(22) Filed: Jan. 30, 2001

(51) Int. Cl.$^7$ .............................. B60T 11/26; B60T 7/02; F15B 7/08
(52) U.S. Cl. ............................................ 60/588; 60/594
(58) Field of Search ........................... 60/588, 592, 594

(56) References Cited

U.S. PATENT DOCUMENTS

| | | | | |
|---|---|---|---|---|
| 3,802,200 A | * | 4/1974 | Kolm | 60/594 |
| 3,935,930 A | * | 2/1976 | Kine | 60/584 |
| 4,560,049 A | * | 12/1985 | Uchibaba et al. | 192/85 R |
| RE33,578 E | * | 4/1991 | Bass | 60/594 |
| 5,050,381 A | * | 9/1991 | Matsuno et al. | 60/584 |
| 5,233,835 A | * | 8/1993 | Gawlick | 60/588 X |
| 5,636,518 A | * | 6/1997 | Burgoyne et al. | 60/594 |
| 5,813,501 A | * | 9/1998 | Terry, Sr. | 188/344 |
| 6,003,639 A | * | 12/1999 | Buckley et al. | 188/26 |

* cited by examiner

Primary Examiner—John E. Ryznic
(74) Attorney, Agent, or Firm—Charles E. Baxley

(57) ABSTRACT

A brake handle device for a hydraulic brake assembly includes a barrel received in a housing and having an outer peripheral depression for forming an annular chamber between the barrel and the housing. A plunger is slidably received in the barrel and has an outer peripheral recess for forming an annular space between the plunger and the barrel. The barrel has two apertures for communicating the annular chamber and the annular space. The housing has a cavity for receiving a spring-biased panel and for regulating the oil when the oil is expanded.

4 Claims, 4 Drawing Sheets

BRAKE HANDLE DEVICE FOR HYDRAULIC BRAKE ASSEMBLY

BACKGROUND OF THE INVENTION

1. Field of the Invention

The present invention relates to a hydraulic brake assembly, and more particularly to a brake handle device for a hydraulic brake assembly.

2. Description of the Prior Art

Typical hydraulic brake assemblies comprise a handle coupled to a disc brake device, for example for actuating the disc brake device. A typical hydraulic cylinder is disposed between the handle and the disc brake device for actuating the disc brake device. The hydraulic cylinder includes a piston slidably received in a housing and has no space chamber for receiving the hydraulic oil. The hydraulic oil may be expanded, or air may be generated within the hydraulic system, when the environment temperature is increased, such that the expanded hydraulic oil may apply a force to actuate the disc brake device even when the handle has not be operated or actuated.

The present invention has arisen to mitigate and/or obviate the afore-described disadvantages of the conventional hydraulic brake assemblies.

SUMMARY OF THE INVENTION

The primary objective of the present invention is to provide a brake handle device for a hydraulic brake assembly having a spare chamber for receiving the hydraulic oil.

The other objective of the present invention is to provide a brake handle device for a hydraulic brake assembly having a space for receiving the expanded hydraulic oil.

In accordance with one aspect of the invention, there is provided a brake handle device for a hydraulic brake assembly comprising a housing, a barrel received in the housing and including an outer peripheral portion having a peripheral depression formed therein for defining or forming an annular chamber between the barrel and the housing, the barrel including a first end having a bore formed therein and including a second end, a coupler coupled to the second end of the barrel, a plunger slidably received in the barrel and including an outer peripheral portion having a peripheral recess formed therein for defining or forming an annular space between the plunger and the barrel. The barrel includes a first aperture formed therein and communicating with the bore and the peripheral depression thereof and the annular chamber defined between the barrel and the housing, and includes a second aperture formed therein and communicating with the peripheral depression thereof with the annular space defined between the plunger and the barrel, for allowing a hydraulic oil to flow between the annular space and the annular chamber and the bore of the barrel and for regulating the oil pressure in the brake device.

A spring biasing device is further provided for biasing the plunger outward of the barrel.

The housing includes a cavity formed therein and communicating with the annular chamber defined between the barrel and the housing, a panel slidably received in the cavity of the housing, and means for biasing the panel to move toward the annular chamber. The biasing means includes a spring received in the cavity of the housing and engaged with the panel.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
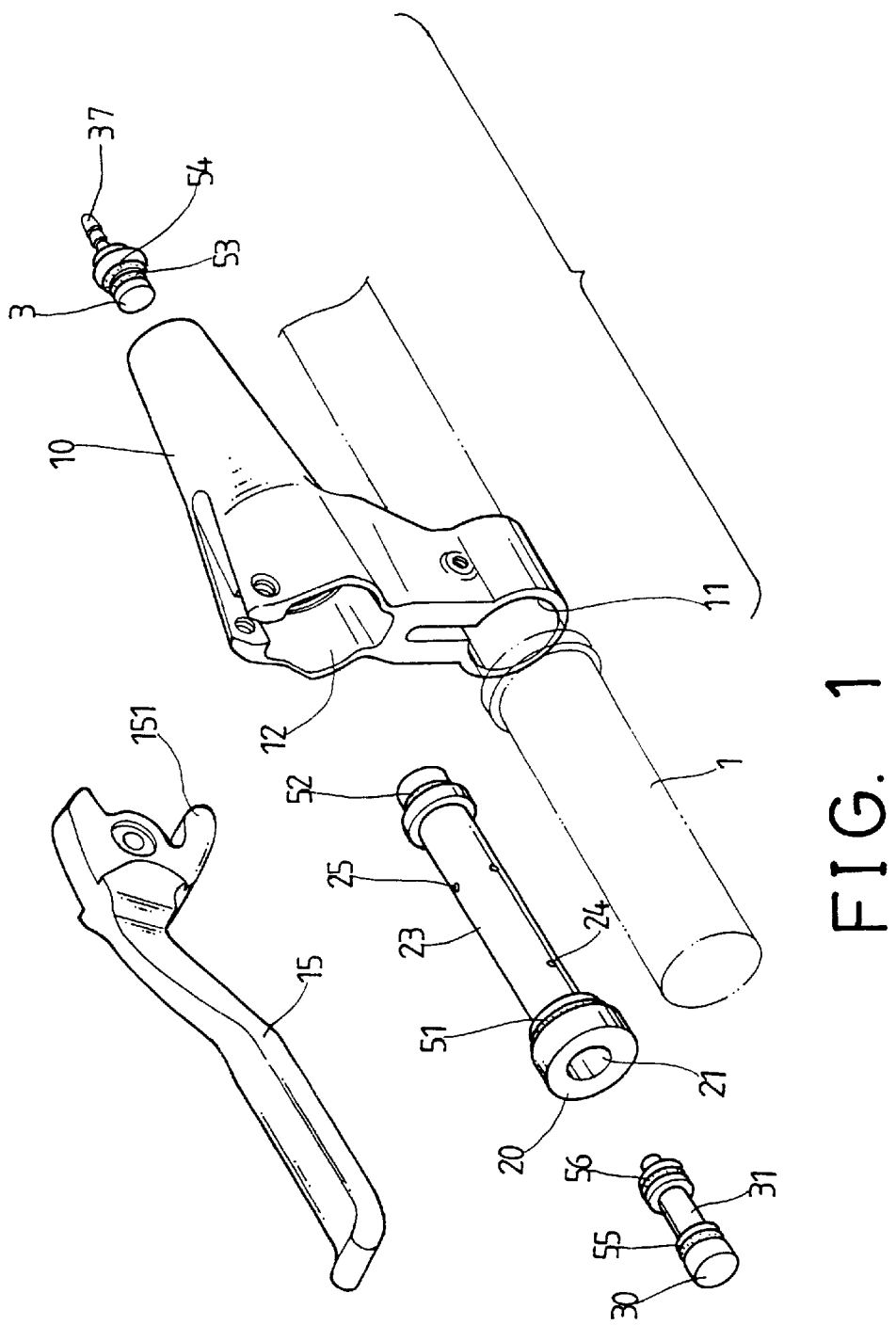
FIG. 1 is an exploded view of a brake handle device in accordance with the present invention.
Figure 2:
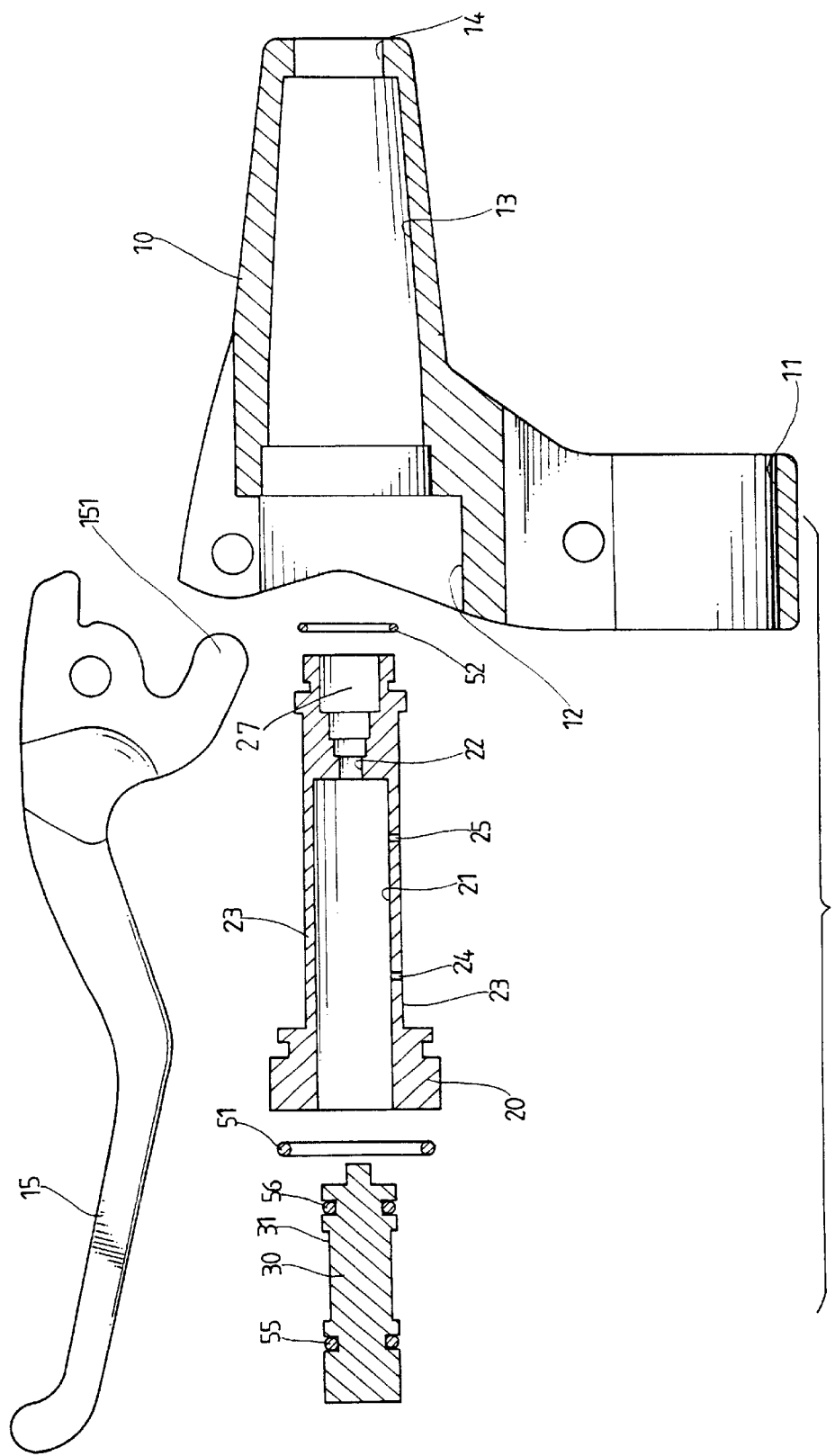
FIG. 2 is a cross sectional and exploded view of the brake handle device.
Figure 3:
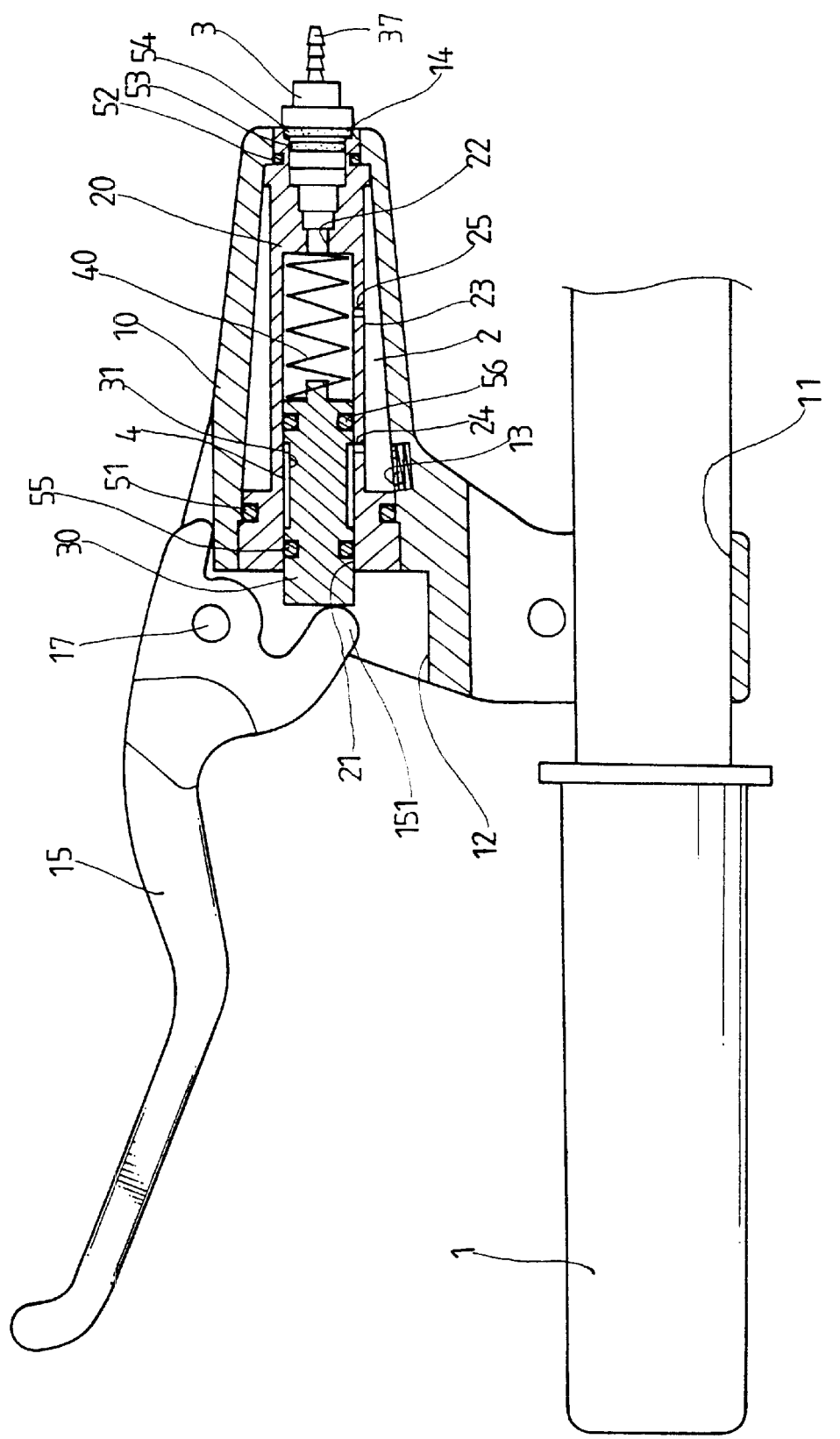
FIGS. 3 and 4 are cross sectional views illustrating the operation of the brake handle device.

Referring to the drawings, and initially to FIGS. 1–3, a brake handle device in accordance with the present invention is provided for a hydraulic brake assembly and comprises a housing 10 including a coupler 11 for securing to a handlebar 1 of the cycles or the like and including an opening 12 and a chamber 13 and an orifice 14 formed therein and communicating with each other and having different inner diameters. A brake lever 15 has one end pivotally or rotatably secured to the housing 10 with a pivot shaft 17 and has an actuator 151 extended therefrom for engaging into the opening 12 or the chamber 13 of the housing 10.

A barrel 20 is received in the opening 12 and the chamber 13 of the housing 10 and includes a bore 21 formed therein and includes a peripheral depression 23 formed in the outer peripheral portion thereof for forming or defining an annular chamber 2 (FIGS. 3, 4) between the barrel 20 and the housing 10. One or more sealing rings 51, 52 are disposed between the barrel 20 and the housing 10, particularly disposed between the ends of the barrel 20 and the housing 10, for making an air tight or a water tight seal between the barrel 20 and the housing 10. The barrel 20 includes two apertures 24, 25 formed therein and communicating between the bore 21 and the peripheral depression 23 thereof, and includes a cavity 27 formed in the other end opposite to the bore 21 thereof, and a passage 22 formed and communicating between the cavity 27 and the bore 21 of the barrel 20. A spring 40 is received in the barrel 20.

A coupler 3 is rotatably received in the cavity 27 of the barrel 20 and includes a port 37 for coupling to the brake member, such as the disc brake device or the hydraulic oil receiving reservoir of the hydraulic brake assembly. One or more sealing rings 53, 54 are disposed between the barrel 20 and the coupler 3 for making an air tight or a water tight seal between the barrel 20 and the coupler 3.

A plunger 30 is slidably received in the bore 21 of the barrel 20 and engaged with the spring 40 which may apply a spring biasing force against the plunger 30 to force the plunger 30 outward of the barrel 20. One or more, such as two sealing rings 55, 56 are disposed between the barrel 20 and the plunger 30, particularly disposed between the ends of the plunger 30 and the barrel 20, for making an air tight or a water tight seal between the barrel 20 and the plunger 30. The plunger 30 includes a peripheral recess 31 formed in the middle portion of the outer peripheral portion thereof for forming or defining an annular space 4 (FIGS. 3, 4) between the barrel 20 and the plunger 30 and for communicating with the aperture 24 of the barrel 20 (FIGS. 3, 4), such that the hydraulic oil may flow from and between the annular space 4 or the peripheral recess 31 of the plunger 30, and the annular chamber 2 or the peripheral depression 23 of the barrel 20, and the bore 21 of the barrel 20.

Figure 4:
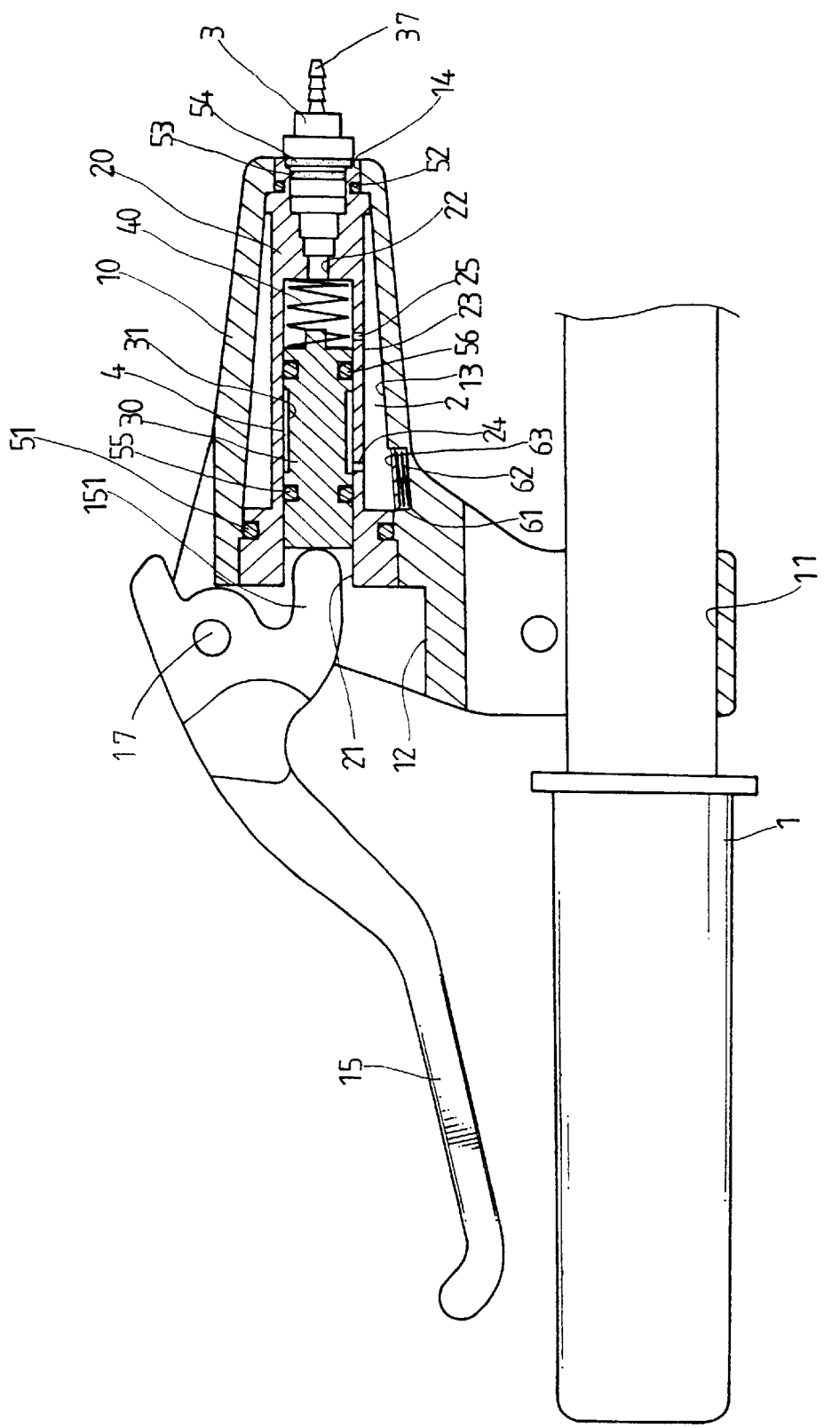

As shown in FIGS. 3 and 4, the housing 10 includes a cavity 61 formed therein and communicating with the chamber 13 of the housing 10. A spring 62 and a panel 63 are received in the cavity 61 of the housing 10. When the hydraulic oil is expanded due to the increasing of the environment temperature, the expanded oil may force the panel 63 against the spring 62 and may thus be received in the cavity 61 of the housing 10, such that the hydraulic oil will not apply an expanding force against the brake device when the hydraulic oil is expanded.

In operation, as shown in FIGS. 3 and 4, when the plunger 30 is forced inward of the barrel 20 by the actuator 151 of the brake lever 15, the plunger 30 may force the oil received in the bore 21 of the barrel 20 through the passage 22 of the barrel 20 and the coupler 3 and may thus be forced to actuate the brake device of the brake assembly. Some of the hydraulic oil may be forced to flow from the bore 21 of the barrel 20 into the annular chamber 2 or the peripheral depression 23 of the barrel 20, and thus to flow into the annular space 4 or the peripheral recess 31 of the plunger 30. The hydraulic oil may also force the panel 63 against the spring 62 and may thus be received in the cavity 61 of the housing 10, such that the oil pressure may be regulated. The spring 40 may force the plunger 30 outward of the barrel 20 when the brake lever 15 is released.

Accordingly, the brake handle device for the hydraulic brake assembly in accordance with the present invention includes a spare chamber for receiving the hydraulic oil, and includes a space for receiving the expanded hydraulic oil.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake handle device for a hydraulic brake assembly comprising:

a housing, a barrel received in said housing and including an outer peripheral portion having a peripheral depression formed therein for defining or forming an annular chamber between said barrel and said housing, said barrel including a first end having a bore formed therein and including a second end, a coupler coupled to said second end of said barrel, a plunger slidably received in said barrel and including an outer peripheral portion having a peripheral recess formed therein for defining or forming an annular space between said plunger and said barrel, and said barrel including a first aperture formed therein and communicating with said bore and said peripheral depression thereof and said annular chamber defined between said barrel and said housing, and including a second aperture formed therein and communicating with said peripheral depression thereof with said annular space defined between said plunger and said barrel, for allowing a hydraulic oil to flow between said annular space and said annular chamber and said bore of said barrel.

2. The brake handle device according to claim 1 further comprising means for biasing said plunger outward of said barrel.

3. The brake handle device according to claim 1, wherein said housing includes a cavity formed therein and communicating with said annular chamber defined between said barrel and said housing, a panel slidably received in said cavity of said housing, and means for biasing said panel to move toward said annular chamber.

4. The brake handle device according to claim 3, wherein said biasing means includes a spring received in said cavity of said housing and engaged with said panel.

* * * * *